United States Patent
Yiu et al.

(10) Patent No.: US 12,133,120 B2
(45) Date of Patent: Oct. 29, 2024

(54) COMMAND HANDLING FOR SIMULTANEOUS CONNECTIVITY HANDOFFS

(71) Applicant: Apple Inc., Cupertino, CA (US)

(72) Inventors: Candy Yiu, Portland, OR (US); Jaemin Han, Portland, OR (US); Sudeep Palat, Gloucestershire (GB); Yi Guo, Shanghai (CN)

(73) Assignee: Apple Inc., Cupertino, CA (US)

( * ) Notice: Subject to any disclaimer, the term of this patent is extended or adjusted under 35 U.S.C. 154(b) by 530 days.

(21) Appl. No.: 17/294,313

(22) PCT Filed: Nov. 12, 2019

(86) PCT No.: PCT/US2019/060864
§ 371 (c)(1),
(2) Date: May 14, 2021

(87) PCT Pub. No.: WO2020/102158
PCT Pub. Date: May 22, 2020

(65) Prior Publication Data
US 2022/0014979 A1    Jan. 13, 2022

Related U.S. Application Data

(60) Provisional application No. 62/767,399, filed on Nov. 14, 2018.

(51) Int. Cl.
*H04W 36/00* (2009.01)

(52) U.S. Cl.
CPC ... *H04W 36/0058* (2018.08); *H04W 36/0072* (2013.01); *H04W 36/0077* (2013.01); *H04W 36/0085* (2018.08)

(58) Field of Classification Search
CPC ......... H04W 36/0058; H04W 36/0072; H04W 36/0077; H04W 36/0085; H04W 36/0016;
(Continued)

(56) References Cited

U.S. PATENT DOCUMENTS

| 11,805,461 B2 * | 10/2023 | Hwang | ........... H04W 36/00837 |
| 2013/0324129 A1 | 12/2013 | Lee et al. | |

(Continued)

FOREIGN PATENT DOCUMENTS

| CN | 104202779 A | 12/2014 |
| WO | 2018132051 A1 | 7/2018 |
| WO | 2018172600 A1 | 9/2018 |
| WO | 2018175819 A1 | 9/2018 |
| WO | 2018203716 A1 | 11/2018 |

OTHER PUBLICATIONS

International Search Report and Written Opinion of the International Searching Authority directed to related International Patent Application No. PCT/US2019/060864, mailed Apr. 7, 2020; 8 pages.

(Continued)

*Primary Examiner* — Marisol Figueroa
(74) *Attorney, Agent, or Firm* — Sterne, Kessler, Goldstein & Fox P.L.L.C.

(57) ABSTRACT

Methods, systems, and storage media are described for command handling for simultaneous connectivity handovers. Other embodiments may be described and/or claimed.

20 Claims, 8 Drawing Sheets

(58) Field of Classification Search
CPC ........... H04W 36/00835; H04W 36/36; H04W 36/0055
See application file for complete search history.

(56) References Cited

U.S. PATENT DOCUMENTS

| | | | | |
|---|---|---|---|---|
| 2014/0024376 | A1* | 1/2014 | Suga | H04W 36/0085 455/436 |
| 2019/0223073 | A1* | 7/2019 | Chen | H04W 36/365 |
| 2019/0281511 | A1* | 9/2019 | Susitaival | H04W 36/0016 |
| 2022/0386197 | A1 | 12/2022 | Hwang et al. | |

OTHER PUBLICATIONS

Intel Corporation, 'Performance evaluation of conditional handover', R2-1816692, 3GPP TSG RAN WG2 Meeting #104, Spokane, USA, Nov. 2, 2018 sections 1-2; and figure 2.
Intel Corporation, 'Discussion of conditional handover', R2-1816691, 3GPP TSG RAN WG2 Meeting #104, Spokane, USA, Nov. 2, 2018 section 2; and figure 2.
Ericsson, 'Conditional handover in LTE', R2-1817399, 3GPP TSG RAN WG2 Meeting #104, Spokane, USA, Nov. 1, 2018 sections 2.2, 2.4; and figure 1.
Mediatek In C., 'Conditional Handover Procedures', R2-1816959, 3GPP TSG RAN WG2 Meeting #104, Spokane, USA, Nov. 2, 2018 sections 2.1-3.
MediaTek Inc., "Performance Evaluation and Implication for Conditional HP," 3GPP TSG-RAN WG2 Meeting #104, Spokane, WA, USA, Nov. 12-16, 2018, R2-1816960; 7 pages.
Intel Corporation, "Discussion of conditional handover," 3GPP TSG RAN WG2 Meeting #105, Athens, Greece, Feb. 25-Mar. 1, 2019, R2-1900870; 5 pages.
Lenovo, Motorola Mobility, "LTE conditional handover," 3GPP TSG-RAN WG2 Meeting #105bis, Xi'an, China, Apr. 8-Apr. 12, 2019, R2-1904156; 4 pages.
Extended European Search Report directed to related European Application No. 19885031.5, mailed Dec. 15, 2021; 19 pages.

* cited by examiner

COMMAND HANDLING FOR SIMULTANEOUS CONNECTIVITY HANDOFFS

RELATED APPLICATION

The present application is a National Stage entry from PCT/US2019/060864 filed on Nov. 12, 2019, entitled "Command Handling for Simultaneous Connectivity Handoff," which claims priority to U.S. Provisional Patent Application No. 62/767,399 filed Nov. 14, 2018, both of which are incorporated by reference in their entireties.

FIELD

Embodiments of the present disclosure relate generally to the technical field of wireless communications.

BACKGROUND

Among other things, embodiments of the present disclosure are directed to command handling for simultaneous connectivity handovers. Some embodiments may operate in conjunction with multiple target cells.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
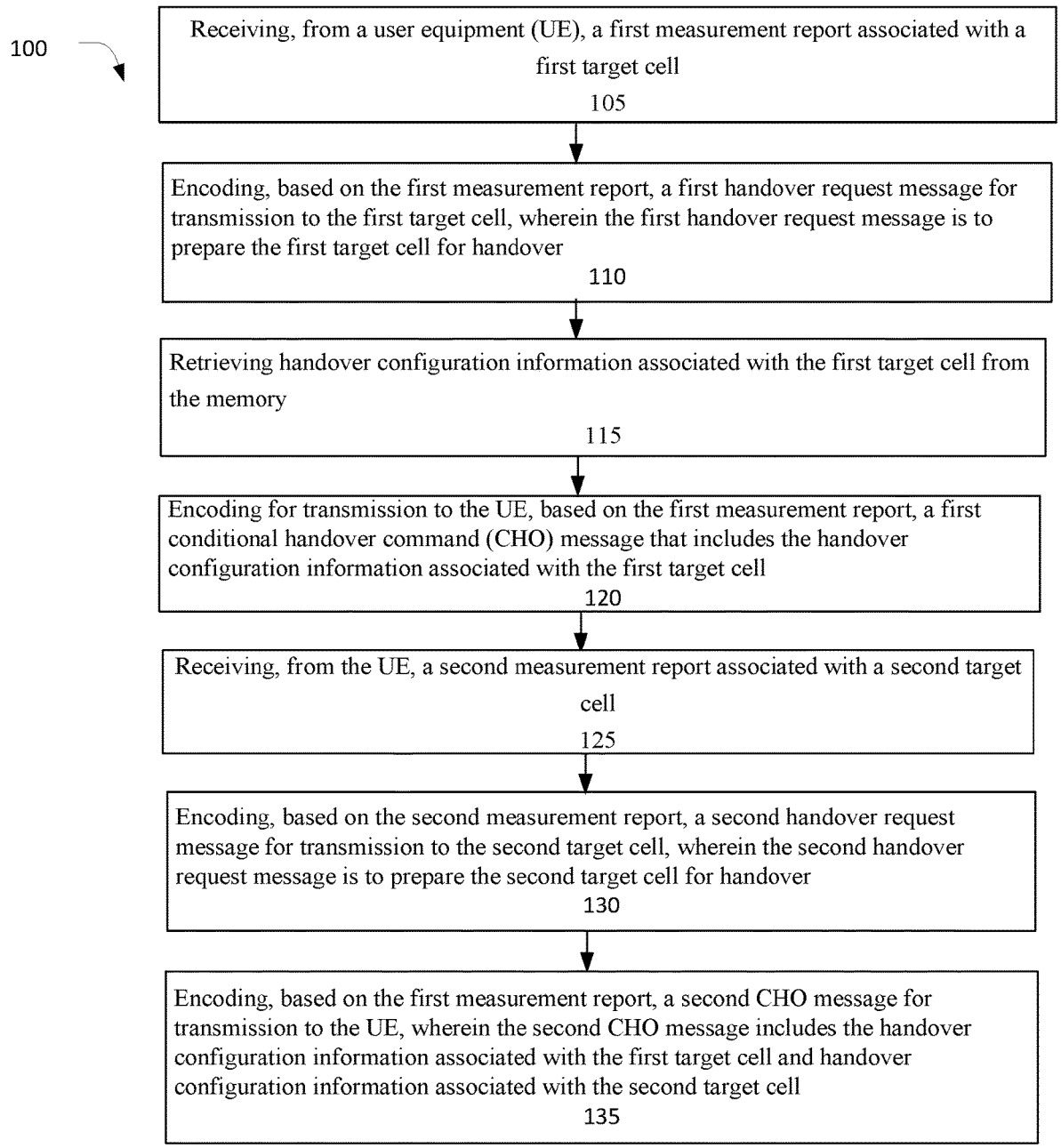
FIGS. 1 and 2, and 3 illustrate examples of operation flow/algorithmic structures in accordance with some embodiments.

Embodiments discussed herein may relate to command handling for simultaneous connectivity handovers. Other embodiments may be described and/or claimed.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc., in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well-known devices, circuits, and methods are omitted so as not to obscure the description of the present invention with unnecessary detail.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in various embodiments," "in some embodiments," and the like may refer to the same, or different, embodiments. The terms "comprising," "having," and "including" are synonymous, unless the context dictates otherwise. The phrase "A and/or B" means (A), (B), or (A and B). The phrases "A/B" and "A or B" mean (A), (B), or (A and B), similar to the phrase "A and/or B." For the purposes of the present disclosure, the phrase "at least one of A and B" means (A), (B), or (A and B). The description may use the phrases "in an embodiment," "in embodiments," "in some embodiments," and/or "in various embodiments," which may each refer to one or more of the same or different embodiments. Furthermore, the terms "comprising," "including," "having," and the like, as used with respect to embodiments of the present disclosure, are synonymous.

Examples of embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function.

Examples of embodiments may be described in the general context of computer-executable instructions, such as program code, software modules, and/or functional processes, being executed by one or more of the aforementioned circuitry. The program code, software modules, and/or functional processes may include routines, programs, objects, components, data structures, etc., that perform particular tasks or implement particular data types. The program code, software modules, and/or functional processes discussed herein may be implemented using existing hardware in existing communication networks. For example, program code, software modules, and/or functional processes discussed herein may be implemented using existing hardware at existing network elements or control nodes.

Embodiments of this disclosure may be generally related to Mobility enhancements in evolved universal terrestrial radio access network (E-UTRAN) systems. Among other things, embodiments of the present disclosure may help reduce user data interruption during handover, which targets as close as possible to 0ms, (e.g., relaxed requirements could be considered). Embodiments of the present disclosure may further help improve system robustness during handover.

Embodiments of the present disclosure may operate with simultaneous connectivity with different cells (e.g., both a source and target eNB), and conditional handover enhancements to make-before-break, including support of carrier aggregation in source and carrier aggregation in a target eNB during handover, and performing down selection or merger, if necessary.

Figure 4:
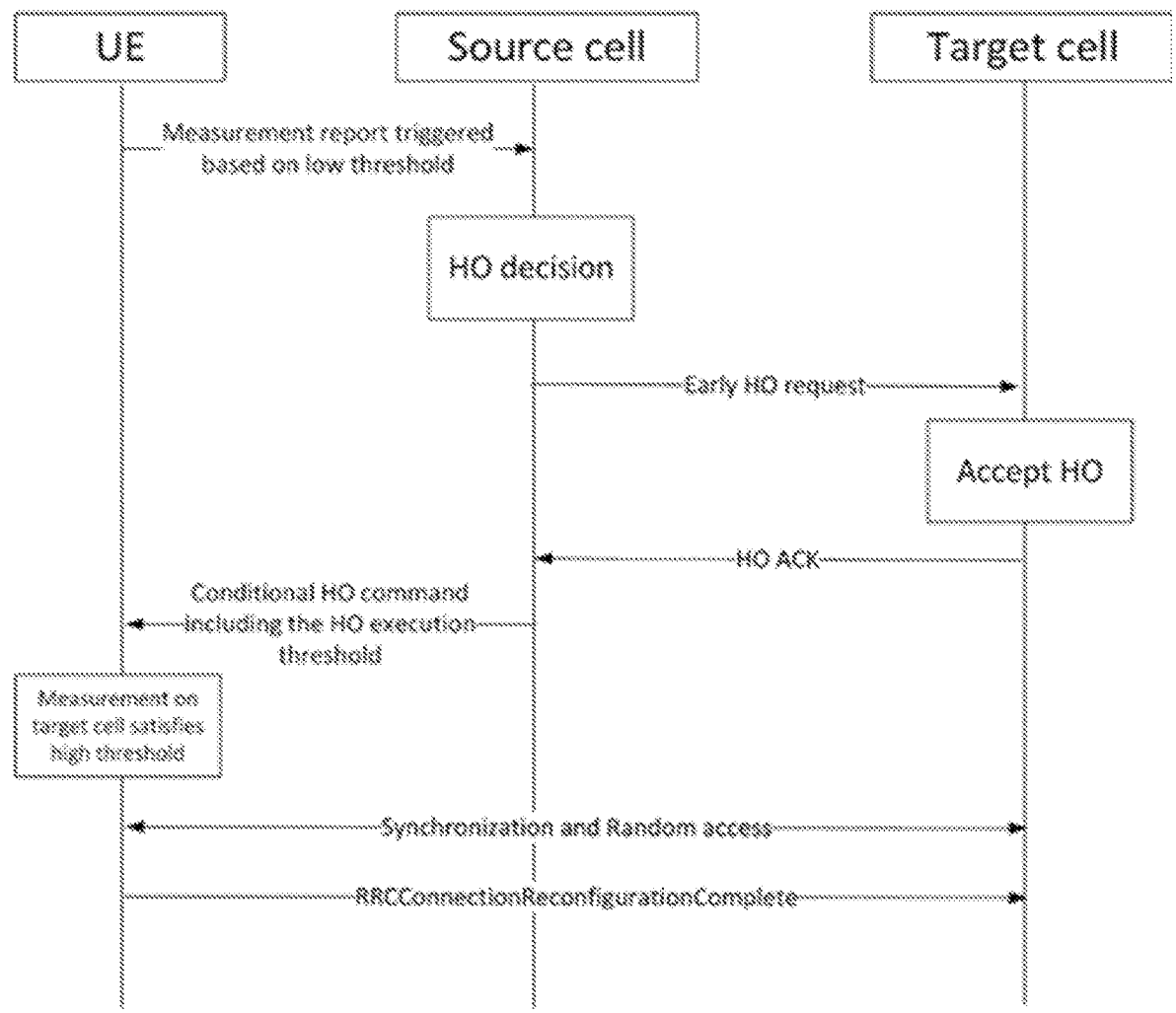
FIG. 4 illustrates an example of a timing diagram illustrating a conditional handover with more than one potential target cell in accordance with some embodiments.

FIG. 4 illustrates an example of a conditional handover signaling flow where multiple potential target cells may trigger the UE, which may be similar to UE XQ01 of Fig. XQ, to send a measurement report. In a conditional handover, a low threshold may be configured to the UE to trigger early measurement reporting. After the source cell reserves the resource (e.g., prepares the target cell), the HO command may be sent to the UE along with a high threshold configuration (this may be configured together with the low threshold). Multiple HO commands may be sent to the UE due to multiple potential target cell satisfying the low threshold. This may result in multiple target cells preparation. Therefore, more signaling overhead in the air interface and X2 is incurred due to multiple measurement reports, target cells preparation and HO commands.

Embodiment 1

Single HO Command

In these embodiments, if only a single HO command is valid, the latest HO command may always override the previous HO command. For example, consider the scenario where multiple target cells satisfy some configured event and UE has sent the measurement report to the source cell:
T1: Cell A triggered the UE sent measurement report to source;
T2: Source cell prepare target cell A and send conditional HO command (CHO) to the UE;
T3: Cell B triggered the UE sent measurement report to source; and
T4: Source cell prepare target cell B and send conditional HO command (CHO) to the UE including both cell A and cell B.

In this embodiment, since the last HO command overrides the previous one and if multiple cells are permitted to be prepared, both cells will need to be included in the HO command.

Embodiment Option 1a

Target Cell Generates the Entire HO Command

In this option, the source may save the previous HO command (cell A in the example above) then forward to the target cell. The target cell includes the configuration of cell A and forwards it to the source cell. If multiple cells are prepared, all prepared configured cells will need to forward from the source cell to the target cell. The source cell will forward the configuration information to the UE.

Embodiment Option 1b

Target and Source Cell Generate Part of the HO Command

In this option, the target cell sends configuration information and generates the HO command similar to the legacy procedure. The Source cell concatenates the previous HO command together with the new HO command and sends it to the UE.

For the target cell that network wants to de-configure, the source cell can simply not include it in the latest HO command. Some target cells may send a de-configuration request to the source cell if a resource is no longer available.

Similarly, if some exit condition applies to some of the prepared cells, such as use of a timer or channel condition, the UE may send an indication to source cell and the source cell can remove it from the HO command.

Embodiment Set 2

Multiple HO Commands

In these embodiments, if all HO commands are valid until an exit condition or explicit indication of de-configuration, then the UE may maintain all HO command states. In this case, the source will only prepare one cell at a time after receiving a measurement report. The target may generate the CHO command and the source will forward the CHO command to the UE. When some CHO command exit condition has been met, the UE may or may not indicate the exit condition to the source. Source may send indication to the related cell to release resources.

If one or more cells are no longer available, those cells may send an indication to the source cell and send an explicit de-configuration message to the UE to release the CHO for the particular cell. In some cases, an indication to release all CHO is possible.

Embodiment Set 3

Single HO Command with Indication of the Validation of the Previous HO Command(s)

These embodiments may be a hybrid between single and multiple HO command. However, since each prepared cell configuration is already sent to the UE, the UE may use the last HO command has the valid HO command. But the last HO command contains an indication of all previous valid HO command. If an indication is not given, it means those cells are no longer valid. The indication may use PCI or PCI+ frequency or HO ID if exist. All other conditions may apply to this embodiment.

Handling of CHO and Legacy HO Commands

When CHO and legacy HO commands are sent to the UE, embodiments of the present disclosure may operate in accordance with the following options:
  Embodiment Option A: the legacy HO command overrides conditional HO since it executes immediately;
  Embodiment Option B: if the condition of the HO command is met after the legacy HO command is received but before the UE successfully camps on target cell, the it may be up to the UE's particular implementation to choose which target cell to camp on; or Embodiment Option C: the CHO command remains valid after legacy HO command is received. However, it is not valid after the successful camping on target cell.

Target Cell Prioritization

In cases where multiple cells satisfy a condition at the same time, the network may indicate in the HO command which cell should have the higher priority to handover to. The UE then may, based on the priority, perform the handover if the cell also satisfies the condition. Otherwise, the cell satisfying the condition sooner should be selected for handover, even if it has a lower priority.

Figure 5:
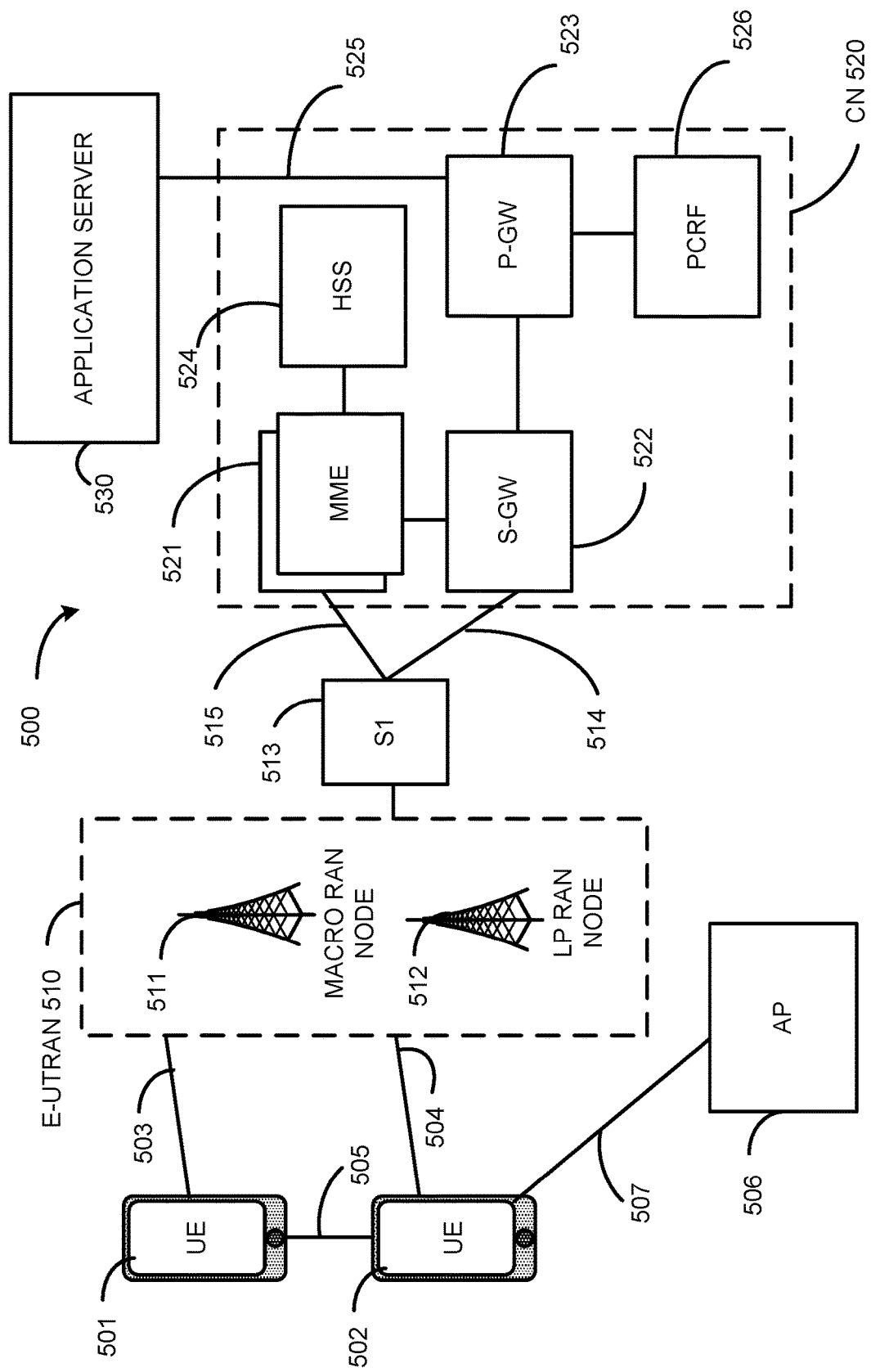
FIG. 5 depicts an architecture of a system of a network in accordance with some embodiments.

FIG. 5 illustrates an architecture of a system 500 of a network in accordance with some embodiments. The system 500 is shown to include a user equipment (UE) 501 and a UE 502. The UEs 501 and 502 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 501 and 502 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 501 and 502 may be configured to connect, e.g., communicatively couple, with a radio access network (RAN) 510—the RAN 510 may be, for example, an Evolved Universal Mobile Telecommunications System (UMTS) Terrestrial Radio Access Network (E-UTRAN), a NextGen RAN (NG RAN), or some other type of RAN. The UEs 501 and 502 utilize connections 503 and 504, respectively, each of which comprises a physical communications interface or layer (discussed in further detail below); in this example, the connections 503 and 504 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 501 and 502 may further directly exchange communication data via a ProSe interface 505. The ProSe interface 505 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 502 is shown to be configured to access an access point (AP) 506 via connection 507. The connection 507 can comprise a local wireless connection, such as a connection consistent with any IEEE 802.11 protocol, wherein the AP 506 would comprise a wireless fidelity (WiFi®) router. In this example, the AP 506 is shown to be connected to the Internet without connecting to the core network of the wireless system (described in further detail below).

The RAN 510 can include one or more access nodes that enable the connections 503 and 504. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 510 may include one or more RAN nodes for providing macrocells, e.g., macro RAN node 511, and one or more RAN nodes for providing femtocells or picocells (e.g., cells having smaller coverage areas, smaller user capacity, or higher bandwidth compared to macrocells, e.g., low power (LP) RAN node 512.

Any of the RAN nodes 511 and 512 can terminate the air interface protocol and can be the first point of contact for the UEs 501 and 502. In some embodiments, any of the RAN nodes 511 and 512 can fulfill various logical functions for the RAN 510 including, but not limited to, radio network controller (RNC) functions such as radio bearer management, uplink and downlink dynamic radio resource management and data packet scheduling, and mobility management.

In accordance with some embodiments, the UEs 501 and 502 can be configured to communicate using Orthogonal Frequency-Division Multiplexing (OFDM) communication signals with each other or with any of the RAN nodes 511 and 512 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 511 and 512 to the UEs 501 and 502, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 501 and 502. The physical downlink control channel (PDCCH)

may carry information about the transport format and resource allocations related to the PDSCH channel, among other things. It may also inform the UEs 501 and 502 about the transport format, resource allocation, and H-ARQ (Hybrid Automatic Repeat Request) information related to the uplink shared channel. Typically, downlink scheduling (assigning control and shared channel resource blocks to the UE 502 within a cell) may be performed at any of the RAN nodes 511 and 512 based on channel quality information fed back from any of the UEs 501 and 502. The downlink resource assignment information may be sent on the PDCCH used for (e.g., assigned to) each of the UEs 501 and 502.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as enhanced resource element groups (EREGs). An ECCE may have other numbers of EREGs in some situations.

The RAN 510 is shown to be communicatively coupled to a core network (CN) 520—via an S1 interface 513. In embodiments, the CN 520 may be an evolved packet core (EPC) network, a NextGen Packet Core (NPC) network, or some other type of CN. In this embodiment, the S1 interface 513 is split into two parts: the S1-U interface 514, which carries traffic data between the RAN nodes 511 and 512 and the serving gateway (S-GW) 522, and the S1-mobility management entity (MME) interface 515, which is a signaling interface between the RAN nodes 511 and 512 and MMEs 521.

In this embodiment, the CN 520 comprises the MMEs 521, the S-GW 522, the Packet Data Network (PDN) Gateway (P-GW) 523, and a home subscriber server (HSS) 524. The MMEs 521 may be similar in function to the control plane of legacy Serving General Packet Radio Service (GPRS) Support Nodes (SGSN). The MMEs 521 may manage mobility aspects in access such as gateway selection and tracking area list management. The HSS 524 may comprise a database for network users, including subscription-related information to support the network entities' handling of communication sessions. The CN 520 may comprise one or several HSSs 524, depending on the number of mobile subscribers, on the capacity of the equipment, on the organization of the network, etc. For example, the HSS 524 can provide support for routing/roaming, authentication, authorization, naming/addressing resolution, location dependencies, etc.

The S-GW 522 may terminate the S1 interface 513 towards the RAN 510, and routes data packets between the RAN 510 and the CN 520. In addition, the S-GW 522 may be a local mobility anchor point for inter-RAN node handovers and also may provide an anchor for inter-3GPP mobility. Other responsibilities may include lawful intercept, charging, and some policy enforcement.

The P-GW 523 may terminate an SGi interface toward a PDN. The P-GW 523 may route data packets between the EPC network and external networks such as a network including the application server 530 (alternatively referred to as application function (AF)) via an Internet Protocol (IP) interface 525. Generally, the application server 530 may be an element offering applications that use IP bearer resources with the core network (e.g., UMTS Packet Services (PS) domain, LTE PS data services, etc.). In this embodiment, the P-GW 523 is shown to be communicatively coupled to an application server 530 via an IP communications interface 525. The application server 530 can also be configured to support one or more communication services (e.g., Voice-over-Internet Protocol (VoIP) sessions, PTT sessions, group communication sessions, social networking services, etc.) for the UEs 501 and 502 via the CN 520.

The P-GW 523 may further be anode for policy enforcement and charging data collection. Policy and Charging Enforcement Function (PCRF) 526 is the policy and charging control element of the CN 520. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 526 may be communicatively coupled to the application server 530 via the P-GW 523. The application server 530 may signal the PCRF 526 to indicate a new service flow and select the appropriate Quality of Service (QoS) and charging parameters. The PCRF 526 may provision this rule into a Policy and Charging Enforcement Function (PCEF) (not shown) with the appropriate traffic flow template (TFT) and QoS class of identifier (QCI), which commences the QoS and charging as specified by the application server 530.

Figure 6:
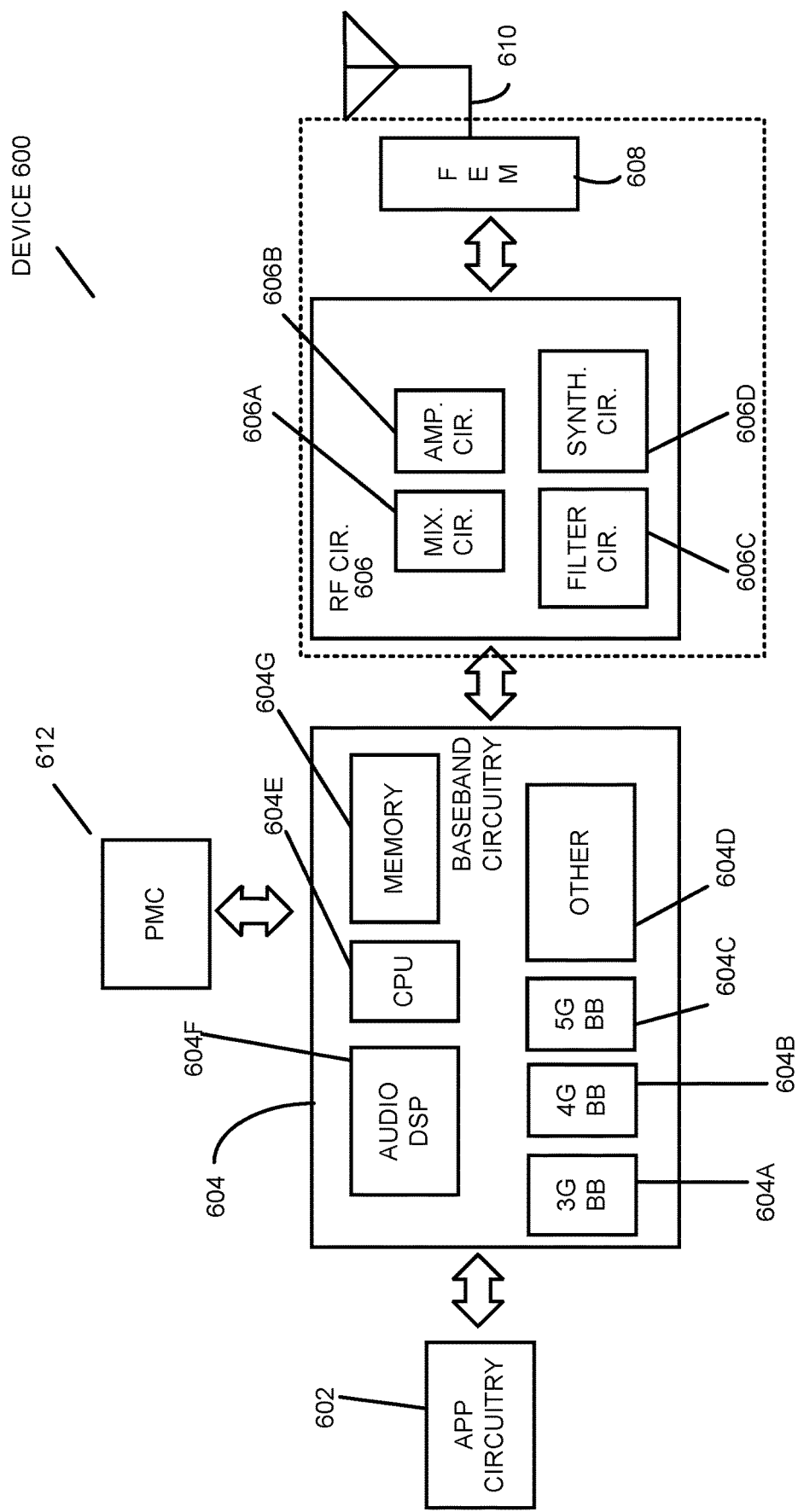
FIG. 6 depicts an example of components of a device in accordance with some embodiments.

FIG. 6 illustrates example components of a device 600 in accordance with some embodiments. In some embodiments, the device 600 may include application circuitry 602, baseband circuitry 604, Radio Frequency (RF) circuitry 606, front-end module (FEM) circuitry 608, one or more antennas 610, and power management circuitry (PMC) 612 coupled together at least as shown. The components of the illustrated device 600 may be included in a UE or a RAN node. In some embodiments, the device 600 may include fewer elements (e.g., a RAN node may not utilize application circuitry 602, and instead include a processor/controller to process IP data received from an EPC). In some embodiments, the device 600 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 602 may include one or more application processors. For example, the application circuitry 602 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 600. In some embodiments, processors of application circuitry 602 may process IP data packets received from an EPC.

The baseband circuitry 604 may include circuitry such as, but not limited to, one or more single-core or multi-core processors. The baseband circuitry 604 may include one or more baseband processors or control logic to process baseband signals received from a receive signal path of the RF circuitry 606 and to generate baseband signals for a transmit signal path of the RF circuitry 606. Baseband processing circuitry 604 may interface with the application circuitry 602 for generation and processing of the baseband signals and for controlling operations of the RF circuitry 606. For example, in some embodiments, the baseband circuitry 604 may include a third generation (3G) baseband processor 604A, a fourth generation (4G) baseband processor 604B, a fifth generation (5G) baseband processor 604C, or other baseband processor(s) 604D for other existing generations, generations in development or to be developed in the future (e.g., second generation (2G), sixth generation (6G), etc.). The baseband circuitry 604 (e.g., one or more of baseband processors 604A-D) may handle various radio control functions that enable communication with one or more radio networks via the RF circuitry 606. In other embodiments, some or all of the functionality of baseband processors 604A-D may be included in modules stored in the memory 604G and executed via a Central Processing Unit (CPU) 604E. The radio control functions may include, but are not limited to, signal modulation/demodulation, encoding/decoding, radio frequency shifting, etc. In some embodiments, modulation/demodulation circuitry of the baseband circuitry 604 may include Fast-Fourier Transform (FFT), precoding, or constellation mapping/demapping functionality. In some embodiments, encoding/decoding circuitry of the baseband circuitry 604 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 604 may include one or more audio digital signal processor(s) (DSP) 604F. The audio DSP(s) 604F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 604 and the application circuitry 602 may be implemented together such as, for example, on a system on a chip (SOC).

In some embodiments, the baseband circuitry 604 may provide for communication compatible with one or more radio technologies. For example, in some embodiments, the baseband circuitry 604 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 604 is configured to support radio communications of more than one wireless protocol may be referred to as multi-mode baseband circuitry.

RF circuitry 606 may enable communication with wireless networks using modulated electromagnetic radiation through a non-solid medium. In various embodiments, the RF circuitry 606 may include switches, filters, amplifiers, etc. to facilitate the communication with the wireless network. RF circuitry 606 may include a receive signal path which may include circuitry to down-convert RF signals received from the FEM circuitry 608 and provide baseband signals to the baseband circuitry 604. RF circuitry 606 may also include a transmit signal path which may include circuitry to up-convert baseband signals provided by the baseband circuitry 604 and provide RF output signals to the FEM circuitry 608 for transmission.

In some embodiments, the receive signal path of the RF circuitry 606 may include mixer circuitry 606a, amplifier circuitry 606b and filter circuitry 606c. In some embodiments, the transmit signal path of the RF circuitry 606 may include filter circuitry 606c and mixer circuitry 606a. RF circuitry 606 may also include synthesizer circuitry 606d for synthesizing a frequency for use by the mixer circuitry 606a of the receive signal path and the transmit signal path. In some embodiments, the mixer circuitry 606a of the receive signal path may be configured to down-convert RF signals received from the FEM circuitry 608 based on the synthesized frequency provided by synthesizer circuitry 606d. The amplifier circuitry 606b may be configured to amplify the down-converted signals and the filter circuitry 606c may be a low-pass filter (LPF) or band-pass filter (BPF) configured to remove unwanted signals from the down-converted signals to generate output baseband signals. Output baseband signals may be provided to the baseband circuitry 604 for further processing. In some embodiments, the output baseband signals may be zero-frequency baseband signals, although this is not a requirement. In some embodiments, mixer circuitry 606a of the receive signal path may comprise passive mixers, although the scope of the embodiments is not limited in this respect.

In some embodiments, the mixer circuitry 606a of the transmit signal path may be configured to up-convert input baseband signals based on the synthesized frequency provided by the synthesizer circuitry 606d to generate RF output signals for the FEM circuitry 608. The baseband signals may be provided by the baseband circuitry 604 and may be filtered by filter circuitry 606c.

In some embodiments, the mixer circuitry 606a of the receive signal path and the mixer circuitry 606a of the transmit signal path may include two or more mixers and may be arranged for quadrature downconversion and upconversion, respectively. In some embodiments, the mixer circuitry 606a of the receive signal path and the mixer circuitry 606a of the transmit signal path may include two or more mixers and may be arranged for image rejection (e.g., Hartley image rejection). In some embodiments, the mixer circuitry 606a of the receive signal path and the mixer circuitry 606a of the transmit signal path may be arranged for direct downconversion and direct upconversion, respectively. In some embodiments, the mixer circuitry 606a of the receive signal path and the mixer circuitry 606a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 606 may include analog-to-digital converter (ADC) and digital-to-analog converter (DAC) circuitry and the baseband circuitry 604 may include a digital baseband interface to communicate with the RF circuitry 606.

In some dual-mode embodiments, a separate radio IC circuitry may be provided for processing signals for each spectrum, although the scope of the embodiments is not limited in this respect.

In some embodiments, the synthesizer circuitry 606*d* may be a fractional-N synthesizer or a fractional N/N+1 synthesizer, although the scope of the embodiments is not limited in this respect as other types of frequency synthesizers may be suitable. For example, synthesizer circuitry 606*d* may be a delta-sigma synthesizer, a frequency multiplier, or a synthesizer comprising a phase-locked loop with a frequency divider.

The synthesizer circuitry 606*d* may be configured to synthesize an output frequency for use by the mixer circuitry 606*a* of the RF circuitry 606 based on a frequency input and a divider control input. In some embodiments, the synthesizer circuitry 606*d* may be a fractional N/N+1 synthesizer.

In some embodiments, frequency input may be provided by a voltage controlled oscillator (VCO), although that is not a requirement. Divider control input may be provided by either the baseband circuitry 604 or the applications processor 602 depending on the desired output frequency. In some embodiments, a divider control input (e.g., N) may be determined from a look-up table based on a channel indicated by the applications processor 602.

Synthesizer circuitry 606*d* of the RF circuitry 606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 606*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 606 may include an IQ/polar converter.

FEM circuitry 608 may include a receive signal path, which may include circuitry configured to operate on RF signals received from one or more antennas 610, amplify the received signals and provide the amplified versions of the received signals to the RF circuitry 606 for further processing. FEM circuitry 608 may also include a transmit signal path, which may include circuitry configured to amplify signals for transmission provided by the RF circuitry 606 for transmission by one or more of the one or more antennas 610. In various embodiments, the amplification through the transmit or receive signal paths may be done solely in the RF circuitry 606, solely in the FEM 608, or in both the RF circuitry 606 and the FEM 608.

In some embodiments, the FEM circuitry 608 may include a TX/RX switch to switch between transmit mode and receive mode operation. The FEM circuitry 608 may include a receive signal path and a transmit signal path. The receive signal path of the FEM circuitry 608 may include a low noise amplifier (LNA) to amplify received RF signals and provide the amplified received RF signals as an output (e.g., to the RF circuitry 606). The transmit signal path of the FEM circuitry 608 may include a power amplifier (PA) to amplify input RF signals (e.g., provided by RF circuitry 606), and one or more filters to generate RF signals for subsequent transmission (e.g., by one or more of the one or more antennas 610).

In some embodiments, the PMC 612 may manage power provided to the baseband circuitry 604. In particular, the PMC 612 may control power-source selection, voltage scaling, battery charging, or DC-to-DC conversion. The PMC 612 may often be included when the device 600 is capable of being powered by a battery, for example, when the device is included in a UE. The PMC 612 may increase the power conversion efficiency while providing desirable implementation size and heat dissipation characteristics.

FIG. 6 shows the PMC 612 coupled only with the baseband circuitry 604. However, in other embodiments, the PMC 612 may be additionally or alternatively coupled with, and perform similar power management operations for, other components such as, but not limited to, application circuitry 602, RF circuitry 606, or FEM 608.

In some embodiments, the PMC 612 may control, or otherwise be part of, various power saving mechanisms of the device 600. For example, if the device 600 is in an RRC_Connected state, where it is still connected to the RAN node as it expects to receive traffic shortly, then it may enter a state known as Discontinuous Reception Mode (DRX) after a period of inactivity. During this state, the device 600 may power down for brief intervals of time and thus save power.

If there is no data traffic activity for an extended period of time, then the device 600 may transition off to an RRC_Idle state, where it disconnects from the network and does not perform operations such as channel quality feedback, handover, etc. The device 600 goes into a very low power state and it performs paging where again it periodically wakes up to listen to the network and then powers down again. The device 600 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 602 and processors of the baseband circuitry 604 may be used to execute elements of one or more instances of a protocol stack. For example, processors of the baseband circuitry 604, alone or in combination, may be used to execute Layer 3, Layer 2, or Layer 1 functionality, while processors of the application circuitry 602 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 7:
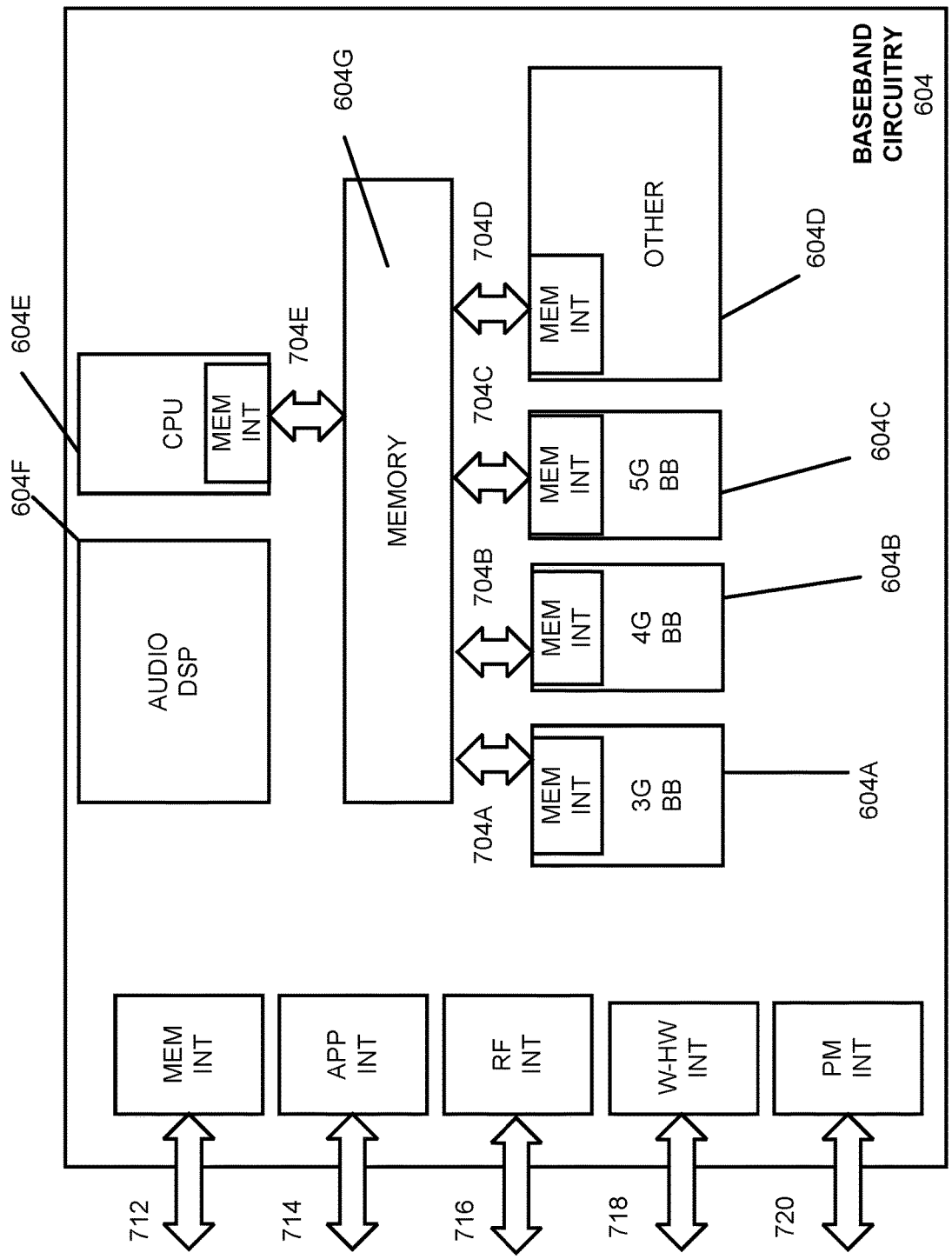
FIG. 7 depicts an example of interfaces of baseband circuitry in accordance with some embodiments.

FIG. 7 illustrates example interfaces of baseband circuitry in accordance with some embodiments. As discussed above, the baseband circuitry 604 of FIG. 6 may comprise processors 604A-604E and a memory 604G utilized by said processors. Each of the processors 604A-604E may include a memory interface, 704A-704E, respectively, to send/receive data to/from the memory 604G.

The baseband circuitry 604 may further include one or more interfaces to communicatively couple to other circuitries/devices, such as a memory interface 712 (e.g., an interface to send/receive data to/from memory external to the baseband circuitry 604), an application circuitry interface 714 (e.g., an interface to send/receive data to/from the application circuitry 602 of FIG. 6), an RF circuitry interface 716 (e.g., an interface to send/receive data to/from RF circuitry 606 of FIG. 6), a wireless hardware connectivity interface 718 (e.g., an interface to send/receive data to/from Near Field Communication (NFC) components, Bluetooth® components (e.g., Bluetooth® Low Energy), Wi-Fi® components, and other communication components), and a power management interface 720 (e.g., an interface to send/receive power or control signals to/from the PMC 612.

Figure 8:
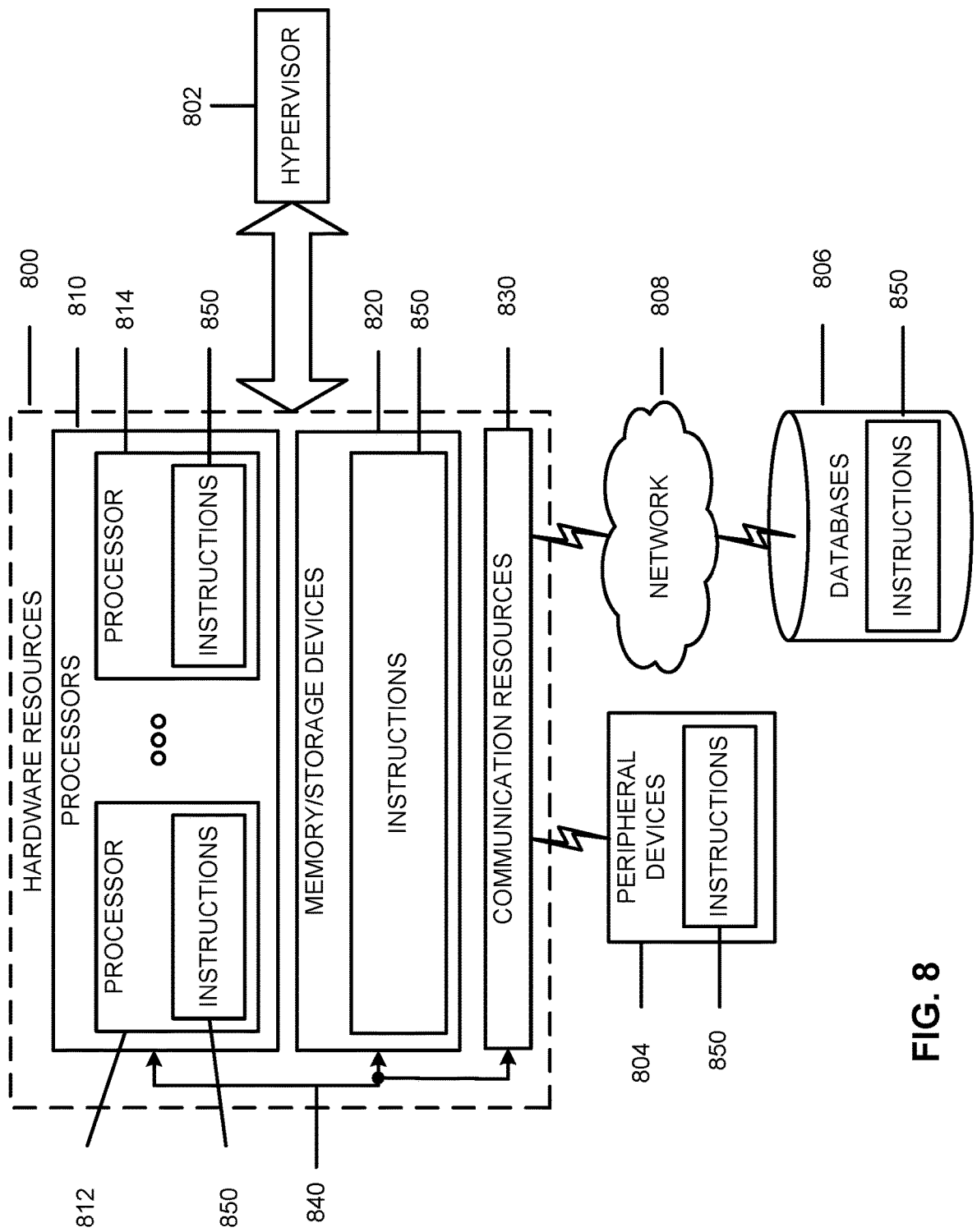
FIG. 8 depicts a block diagram illustrating components, according to some embodiments, able to read instructions from a machine-readable or computer-readable medium (e.g., a non-transitory machine-readable storage medium) and perform any one or more of the methodologies discussed herein.

FIG. 8 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 8 shows a diagrammatic representation of hardware resources 800 including one or more processors (or processor cores) 810, one or more memory/storage devices 820, and one or more communication resources 830, each of which may be communicatively coupled via a bus 840. For embodiments where node virtualization (e.g., NFV) is utilized, a hypervisor 802 may be executed to provide an execution environment for one or more network slices/sub-slices to utilize the hardware resources 800.

The processors 810 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 812 and a processor 814.

The memory/storage devices 820 may include main memory, disk storage, or any suitable combination thereof. The memory/storage devices 820 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 830 may include interconnection or network interface components or other suitable devices to communicate with one or more peripheral devices 804 or one or more databases 806 via a network 808. For example, the communication resources 830 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 850 may comprise software, a program, an application, an applet, an app, or other executable code for causing at least any of the processors 810 to perform any one or more of the methodologies discussed herein. The instructions 850 may reside, completely or partially, within at least one of the processors 810 (e.g., within the processor's cache memory), the memory/storage devices 820, or any suitable combination thereof. Furthermore, any portion of the instructions 850 may be transferred to the hardware resources 800 from any combination of the peripheral devices 804 or the databases 806. Accordingly, the memory of processors 810, the memory/storage devices 820, the peripheral devices 804, and the databases 806 are examples of computer-readable and machine-readable media.

Figure 2:
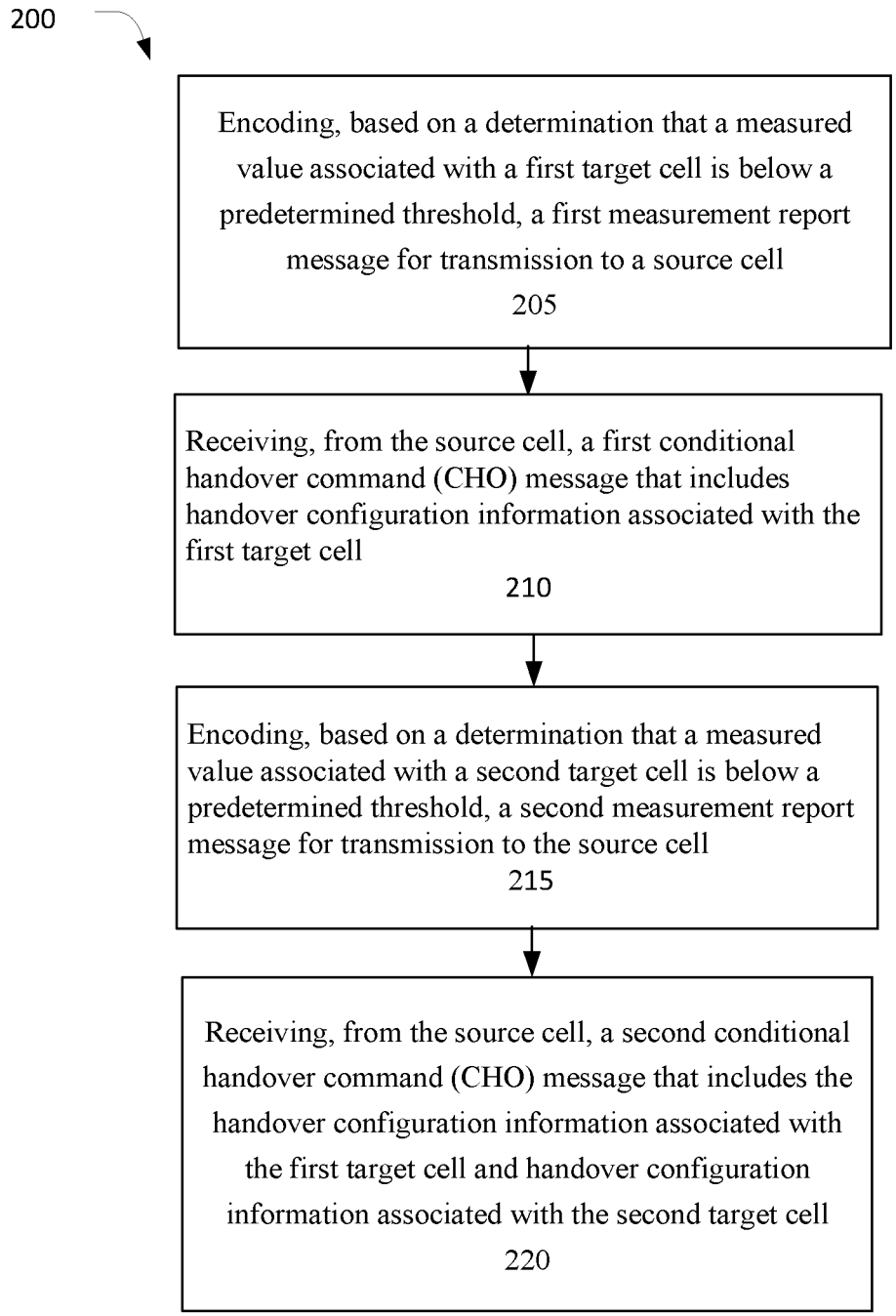
Figure 3:
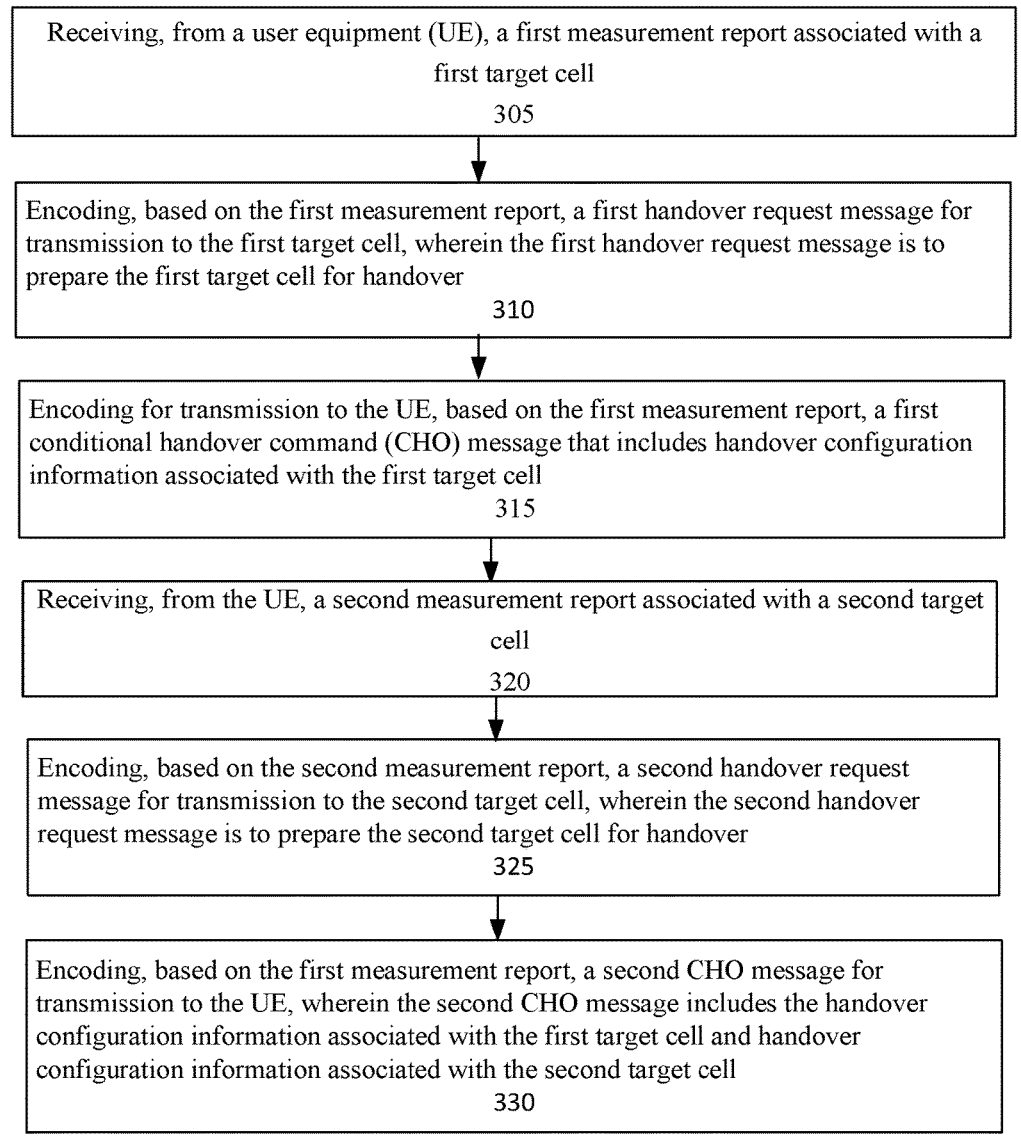

In various embodiments, the devices/components of FIGS. 5-8, and particularly the baseband circuitry of FIG. 7, may be used to practice, in whole or in part, any of the operation flow/algorithmic structures depicted in FIGS. 1-3.

One example of an operation flow/algorithmic structure is depicted in FIG. 1, which may be performed by an evolved NodeB (eNB) or next-generation NodeB (gNB) in accordance with some embodiments. In this example, operation flow/algorithmic structure 100 may include, at 105, receiving, from a user equipment (UE), a first measurement report associated with a first target cell. Operation flow/algorithmic structure 100 may further include, at 110, encoding, based on the first measurement report, a first handover request message for transmission to the first target cell, wherein the first handover request message is to prepare the first target cell for handover. Operation flow/algorithmic structure 100 may further include, at 115, retrieving handover configuration information associated with the first target cell from the memory. Operation flow/algorithmic structure 100 may further include, at 120, encoding for transmission to the UE, based on the first measurement report, a first conditional handover command (CHO) message that includes the handover configuration information associated with the first target cell. Operation flow/algorithmic structure 100 may further include, at 125, receiving, from the UE, a second measurement report associated with a second target cell. Operation flow/algorithmic structure 100 may further include, at 130, encoding, based on the second measurement report, a second handover request message for transmission to the second target cell, wherein the second handover request message is to prepare the second target cell for handover. Operation flow/algorithmic structure 100 may further include, at 135, encoding, based on the first measurement report, a second CHO message for transmission to the UE, wherein the second CHO message includes the handover configuration information associated with the first target cell and handover configuration information associated with the second target cell.

Another example of an operation flow/algorithmic structure is depicted in FIG. 2, which may be performed by a UE in accordance with some embodiments. In this example, operation flow/algorithmic structure 200 may include, at 205, encoding, based on a determination that a measured value associated with a first target cell is below a predetermined threshold, a first measurement report message for transmission to a source cell. Operation flow/algorithmic structure 200 may further include, at 210, receiving, from the source cell, a first conditional handover command (CHO) message that includes handover configuration information associated with the first target cell. Operation flow/algorithmic structure 200 may further include, at 215, encoding, based on a determination that a measured value associated with a second target cell is below a predetermined threshold, a second measurement report message for transmission to the source cell. Operation flow/algorithmic structure 200 may further include, at 220, receiving, from the source cell, a second conditional handover command (CHO) message that includes the handover configuration information associated with the first target cell and handover configuration information associated with the second target cell.

Another example of an operation flow/algorithmic structure is depicted in FIG. 3, which may be performed by an evolved NodeB (eNB) or next-generation NodeB (gNB) in accordance with some embodiments. In this example, operation flow/algorithmic structure 300 may include, at 305, receiving, from a user equipment (UE), a first measurement report associated with a first target cell. Operation flow/algorithmic structure 300 may further include, at 310, encoding, based on the first measurement report, a first handover request message for transmission to the first target cell, wherein the first handover request message is to prepare the first target cell for handover. Operation flow/algorithmic structure 300 may further include, at 315, encoding for transmission to the UE, based on the first measurement report, a first conditional handover command (CHO) message that includes the handover configuration information associated with the first target cell. Operation flow/algorithmic structure 300 may further include, at 320, receiving, from the UE, a second measurement report associated with a second target cell. Operation flow/algorithmic structure 300 may further include, at 325, encoding, based on the second measurement report, a second handover request message for transmission to the second target cell, wherein the second handover request message is to prepare the second target cell for handover. Operation flow/algorithmic structure 300 may further include, at 330, encoding, based on the first measurement report, a second CHO message for transmission to the UE, wherein the second CHO message includes the handover configuration information associated with the first target cell and handover configuration information associated with the second target cell.

EXAMPLES

Some non-limiting examples are provided below.

Example 1 includes an apparatus comprising: memory to store handover configuration information; and processing circuitry, coupled with the memory, to: receive, from a user equipment (UE), a first measurement report associated with a first target cell; encode, based on the first measurement report, a first handover request message for transmission to the first target cell, wherein the first handover request message is to prepare the first target cell for handover; retrieve handover configuration information associated with the first target cell from the memory; encode for transmission to the UE, based on the first measurement report, a first conditional handover command (CHO) message that includes the handover configuration information associated with the first target cell; receive, from the UE, a second measurement report associated with a second target cell; encode, based on the second measurement report, a second handover request message for transmission to the second target cell, wherein the second handover request message is to prepare the second target cell for handover; and encode, based on the first measurement report, a second CHO message for transmission to the UE, wherein the second CHO message includes the handover configuration information associated with the first target cell and handover configuration information associated with the second target cell.

Example 2 includes the apparatus of example 1 or some other example herein, wherein the processing circuitry is further to: receive, from the first target cell, the handover configuration information associated with the first target cell; and store the handover configuration information associated with the first target cell in the memory.

Example 3 includes the apparatus of example 1 or some other example herein, wherein the processing circuitry is further to: receive, from the second target cell, the handover configuration information associated with the second target cell; and store the handover configuration information associated with the second target cell in the memory.

Example 4 includes the apparatus of example 1 or some other example herein, wherein the second handover request message includes the handover configuration information associated with the first target cell.

Example 5 includes the apparatus of example 1 or some other example herein, wherein the processing circuitry is further to encode a third handover request message for transmission to the first target cell, the third handover request message including a de-configuration request for the first target cell.

Example 6 includes the apparatus of example 1 or some other example herein, wherein the processing circuitry is further to: receive, from the second target cell, a message including an indication that resources associated with the second target cell are unavailable; and encode a de-configuration message for transmission to the UE, wherein the de-configuration message is to indicate that the UE is to release the CHO for the second target cell.

Example 7 includes the apparatus of example 1 or some other example herein, wherein the handover configuration information associated with the second target cell includes a high threshold indicator for a measured value associated with the second target cell.

Example 8 includes the apparatus of example 1 or some other example herein, wherein the handover configuration information associated with the second target cell includes a low threshold indicator for a measured value associated with the second target cell.

Example 9 includes the apparatus of any one of claims 1-8, wherein the apparatus is an evolved NodeB (eNB) or portion thereof, or a next-generation NodeB (gNB) or portion thereof.

Example 10 includes one or more computer-readable media storing instructions that, when executed by one or more processors, cause a user equipment (UE) to: encode, based on a determination that a measured value associated with a first target cell is below a predetermined threshold, a first measurement report message for transmission to a source cell; receive, from the source cell, a first conditional handover command (CHO) message that includes handover configuration information associated with the first target cell; encode, based on a determination that a measured value associated with a second target cell is below a predetermined threshold, a second measurement report message for transmission to the source cell; and receive, from the source cell, a second conditional handover command (CHO) message that includes the handover configuration information associated with the first target cell and handover configuration information associated with the second target cell.

Example 11 includes the one or more computer-readable media of example 10 or some other example herein, wherein the media further stores instructions for causing the UE to override the handover configuration information from the first CHO message with the handover configuration information from the second CHO message.

Example 12 includes the one or more computer-readable media of example 10 or some other example herein, wherein the media further stores instructions for causing the UE to encode a message for transmission to the source cell that indicates an exit condition applies to the first target cell or the second target cell.

Example 13 includes the one or more computer-readable media of example 10 or some other example herein, wherein the media further stores instructions for causing the UE to perform a synchronization and random access procedure with the second target cell.

Example 14 includes the one or more computer-readable media of any one of examples 10-13 or some other example herein, wherein the media further stores instructions for causing the UE to: receive a de-configuration message from the source cell; and release the CHO for the second target cell in response based on the de-configuration message.

Example 15 includes one or more computer-readable media storing instructions that, when executed by one or more processors, cause an evolved NodeB (eNB) to: receive, from a user equipment (UE), a first measurement report associated with a first target cell; encode, based on the first measurement report, a first handover request message for transmission to the first target cell, wherein the first handover request message is to prepare the first target cell for handover; encode for transmission to the UE, based on the first measurement report, a first conditional handover command (CHO) message that includes handover configuration information associated with the first target cell; receive, from the UE, a second measurement report associated with a second target cell; encode, based on the second measurement report, a second handover request message for transmission to the second target cell, wherein the second handover request message is to prepare the second target cell for handover; and encode, based on the first measurement report, a second CHO message for transmission to the UE, wherein the second CHO message includes the handover configuration information associated with the first target cell and handover configuration information associated with the second target cell.

Example 16 includes the one or more computer-readable media of example 15 or some other example herein, wherein the media further stores instructions for causing the eNB to: receive, from the first target cell, the handover configuration information associated with the first target cell; and store the handover configuration information associated with the first target cell in the memory.

Example 17 includes the one or more computer-readable media of example 15 or some other example herein, wherein the media further stores instructions for causing the eNB to: receive, from the second target cell, the handover configuration information associated with the second target cell; and store the handover configuration information associated with the second target cell in the memory.

Example 18 includes the one or more computer-readable media of example 15 or some other example herein, wherein the second handover request message includes the handover configuration information associated with the first target cell.

Example 19 includes the one or more computer-readable media of example 15 or some other example herein, wherein the media further stores instructions for causing the eNB to encode a third handover request message for transmission to the first target cell, the third handover request message including a de-configuration request for the first target cell.

Example 20 includes the one or more computer-readable media of example 15 or some other example herein, wherein the media further stores instructions for causing the eNB to: receive, from the second target cell, a message including an indication that resources associated with the second target cell are unavailable; and encode a de-configuration message for transmission to the UE, wherein the de-configuration message is to indicate that the UE is to release the CHO for the second target cell.

Example 21 may include an apparatus comprising means to perform one or more elements of a method described in or related to any of examples 1-20, or any other method or process described herein.

Example 22 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 23 may include an apparatus comprising logic, modules, and/or circuitry to perform one or more elements of a method described in or related to any of examples 1-20, or any other method or process described herein.

Example 24 may include a method, technique, or process as described in or related to any of examples 1-20, or portions or parts thereof.

Example 25 may include an apparatus comprising: one or more processors and one or more computer-readable media comprising instructions that, when executed by the one or more processors, cause the one or more processors to perform the method, techniques, or process as described in or related to any of examples 1-20, or portions thereof.

Example 26 may include a method of communicating in a wireless network as shown and described herein.

Example 27 may include a system for providing wireless communication as shown and described herein.

Example 28 may include a device for providing wireless communication as shown and described herein.

The description herein of illustrated implementations, including what is described in the Abstract, is not intended to be exhaustive or to limit the present disclosure to the precise forms disclosed. While specific implementations and examples are described herein for illustrative purposes, a variety of alternate or equivalent embodiments or implementations calculated to achieve the same purposes may be made in light of the above detailed description, without departing from the scope of the present disclosure.

What is claimed is:
1. A base station (BS) comprising:
   memory to store handover configuration information; and
   processing circuitry, coupled with the memory, configured to:
      receive, from a user equipment (UE), a first measurement report associated with a first target cell;

encode, based on the first measurement report, a first handover request message for transmission to the first target cell, wherein the first handover request message is to prepare the first target cell for handover;

retrieve handover configuration information associated with the first target cell from the memory;

encode for transmission to the UE, based on the first measurement report, a first conditional handover command (CHO) message that includes the handover configuration information associated with the first target cell;

receive, from the UE, a second measurement report associated with a second target cell;

encode, based on the second measurement report, a second handover request message for transmission to the second target cell, wherein the second handover request message is to prepare the second target cell for handover, and wherein the second handover request message includes the handover configuration information associated with the first target cell; and encode, based on the first measurement report, a second CHO message for transmission to the UE, wherein the second CHO message includes the handover configuration information associated with the first target cell and handover configuration information associated with the second target cell.

2. The BS of claim 1, wherein the processing circuitry is further configured to:
receive, from the first target cell, the handover configuration information associated with the first target cell; and
store the handover configuration information associated with the first target cell in the memory.

3. The BS of claim 1, wherein the processing circuitry is further configured to:
receive, from the second target cell, the handover configuration information associated with the second target cell; and
store the handover configuration information associated with the second target cell in the memory.

4. The BS of claim 1, wherein the processing circuitry is further configured to encode a third handover request message for transmission to the first target cell, the third handover request message including a de-configuration request for the first target cell.

5. The BS of claim 1, wherein the processing circuitry is further configured to:
receive, from the second target cell, a message including an indication that resources associated with the second target cell are unavailable; and
encode a de-configuration message for transmission to the UE, wherein the de-configuration message is to indicate that the UE is to release a CHO for the second target cell.

6. The BS of claim 1, wherein the handover configuration information associated with the second target cell includes a high threshold indicator for a measured value associated with the second target cell.

7. The BS of claim 1, wherein the handover configuration information associated with the second target cell includes a low threshold indicator for a measured value associated with the second target cell.

8. The BS of claim 1, wherein the BS is an evolved NodeB (eNB) or portion thereof, or a next-generation NodeB (gNB) or portion thereof.

9. A non-transitory computer-readable storage media (CRSM) comprising instructions that, when executed by one or more processors of a user equipment (UE), cause the UE to perform operations, the operations comprising:
encoding, based on a determination that a measured value associated with a first target cell is below a predetermined threshold, a first measurement report message for transmission to a source cell;
receiving, from the source cell, a first conditional handover command (CHO) message that includes handover configuration information associated with the first target cell;
encoding, based on a determination that a measured value associated with a second target cell is below a predetermined threshold, a second measurement report message for transmission to the source cell; and
receiving, from the source cell, a second conditional handover command (CHO) message that includes the handover configuration information associated with the first target cell and handover configuration information associated with the second target cell, wherein the second CHO message is encoded based on a response to a handover request message sent from the source cell to the second target cell, and wherein the handover request message includes the handover configuration information associated with the first target cell.

10. The non-transitory CRSM of claim 9, wherein the operations further comprise overriding the handover configuration information from the first CHO message with the handover configuration information from the second CHO message.

11. The non-transitory CRSM of claim 9, wherein the operations further comprise encoding a message for transmission to the source cell that indicates an exit condition applies to the first target cell or the second target cell.

12. The non-transitory CRSM of claim 9, wherein the operations further comprise performing a synchronization and random access procedure with the second target cell.

13. The non-transitory CRSM of claim 9, wherein the operations further comprise:
receiving a de-configuration message from the source cell; and
releasing a CHO for the second target cell in response based on the de-configuration message.

14. A non-transitory computer-readable storage media (CRSM) comprising instructions that, when executed by one or more processors of a base station (BS), cause the BS to perform operations, the operations comprising:
receiving, from a user equipment (UE), a first measurement report associated with a first target cell;
encoding, based on the first measurement report, a first handover request message for transmission to the first target cell, wherein the first handover request message is to prepare the first target cell for handover;
encoding for transmission to the UE, based on the first measurement report, a first conditional handover command (CHO) message that includes handover configuration information associated with the first target cell;
receiving, from the UE, a second measurement report associated with a second target cell;
encoding, based on the second measurement report, a second handover request message for transmission to the second target cell, wherein the second handover request message is to prepare the second target cell for handover, and wherein the second handover request message includes the handover configuration information associated with the first target cell; and
encoding, based on the first measurement report, a second CHO message for transmission to the UE, wherein the second CHO message includes the handover configuration information associated with the first target cell and handover configuration information associated with the second target cell.

15. The non-transitory CRSM of claim 14, wherein the operations further comprise:
   receiving, from the first target cell, the handover configuration information associated with the first target cell; and
   storing the handover configuration information associated with the first target cell in a memory.

16. The non-transitory CRSM of claim 14, wherein the operations further comprise:
   receiving, from the second target cell, the handover configuration information associated with the second target cell; and
   storing the handover configuration information associated with the second target cell in a memory.

17. The non-transitory CRSM of claim 14, wherein the operations further comprise encoding a third handover request message for transmission to the first target cell, the third handover request message including a de-configuration request for the first target cell.

18. The non-transitory CRSM of claim 14, wherein the operations further comprise:
   receiving, from the second target cell, a message including an indication that resources associated with the second target cell are unavailable; and
   encoding a de-configuration message for transmission to the UE, wherein the de-configuration message is to indicate that the UE is to release a CHO for the second target cell.

19. The non-transitory CRSM of claim 14, wherein the handover configuration information associated with the second target cell includes a high threshold indicator for a measured value associated with the second target cell.

20. The non-transitory CRSM of claim 14, wherein the handover configuration information associated with the second target cell includes a low threshold indicator for a measured value associated with the second target cell.

* * * * *